United States Patent
Phillips et al.

(10) Patent No.: US 8,612,077 B2
(45) Date of Patent: Dec. 17, 2013

(54) HYBRID ELECTRIC VEHICLE AND METHOD OF PATH DEPENDENT RECEDING HORIZON CONTROL

(75) Inventors: Anthony Mark Phillips, Northville, MI (US); Georgia-Evangelia Katsargyri, Cambridge, MA (US); Ming Lang Kuang, Canton, MI (US); Ilya Vladimir Kolmanovsky, Novi, MI (US); John Ottavio Michelini, Sterling Heights, MI (US); Munther Abdullah Dahleh, Cambridge, MA (US); Michael David Rinehart, Quincy, MA (US)

(73) Assignees: Massachusetts Institute of Technology, Cambridge, MA (US); Ford Global Technologies, LLC, Dearborn, MI (US)

(*) Notice: Subject to any disclaimer, the term of this patent is extended or adjusted under 35 U.S.C. 154(b) by 147 days.

(21) Appl. No.: 13/176,972

(22) Filed: Jul. 6, 2011

(65) Prior Publication Data
US 2012/0010768 A1   Jan. 12, 2012

Related U.S. Application Data

(60) Provisional application No. 61/361,948, filed on Jul. 7, 2010.

(51) Int. Cl.
*B60L 9/00* (2006.01)
*B60K 6/20* (2007.10)
*B60W 20/00* (2006.01)
*G06F 7/00* (2006.01)
*G06F 19/00* (2011.01)

(52) U.S. Cl.
USPC ............ 701/22; 180/65.21; 180/65.265; 180/65.29; 701/36; 701/57; 701/58; 701/59; 701/104; 701/123; 701/467

(58) Field of Classification Search
USPC ............ 701/22, 36, 57–58, 99, 104, 123, 467, 701/206; 180/65.29, 65.21, 65.265
See application file for complete search history.

(56) References Cited

U.S. PATENT DOCUMENTS 6,687,581 B2 *  2/2004  Deguchi et al. ............... 701/22
(Continued)

OTHER PUBLICATIONS

Nick Chambers, Volvo Unveils Plug-in Hybrid Diesel V60:124 MPG, 30 Electric Miles, AWD, 0-60 in 6.9 sec., Published in PluginCars.com(http://www.plugincars.com), Feb. 21, 2011.
Georgia-Evangelia Katsargyri et al., Optimally Controlling Hybrid Electric Vehicles Using Path Forecasting, 2009 American Control Conference, Jun. 10-12, 2009.
(Continued)

*Primary Examiner* — Fadey Jabr
*Assistant Examiner* — Basil T Jos
(74) *Attorney, Agent, or Firm* — David B. Kelley; Brooks Kushman P.C.

(57) ABSTRACT

A path-dependent control of a hybrid electric vehicle (HEV) includes segmenting an original route into segments. A virtual route based on the remaining portion of the original route is generated once the HEV reaches a current segment of the original route. The virtual route includes a first segment corresponding to the current segment of the original route and a last segment representing at least two other segments of the remaining portion of the original route. Battery SoC set-points for the segments of the virtual route are generated. The vehicle is controlled according to the battery SoC set-point for the first segment of the virtual route as the vehicle travels along the current segment of the original route.

10 Claims, 3 Drawing Sheets

(56) References Cited

U.S. PATENT DOCUMENTS

| | | |
|---|---|---|
| 7,865,298 B2 | 1/2011 | Macneille et al. |
| 7,904,217 B2 | 3/2011 | Miller |
| 2009/0171522 A1 | 7/2009 | Luo et al. |
| 2009/0259363 A1* | 10/2009 | Li et al. .................. 701/36 |
| 2010/0138089 A1 | 6/2010 | James |

OTHER PUBLICATIONS

Georgia-Evangelia Katsargyri et al., Path Dependent Receding Horizon Control Policies for Hybrid Electric Vehicles, 18th IEEE International Conference on Control Applications, Part of 2009 IEEE Multi-Conference on Systems and Control Saint Petersburg, Russia, Jul. 8-10, 2009.

* cited by examiner

HYBRID ELECTRIC VEHICLE AND METHOD OF PATH DEPENDENT RECEDING HORIZON CONTROL

CROSS-REFERENCE TO RELATED APPLICATIONS

This application claims the benefit of U.S. Provisional Application No. 61/361,948, filed Jul. 7, 2010; the disclosure of which is hereby incorporated by reference herein in its entirety.

TECHNICAL FIELD

The present invention relates to path dependent control of hybrid electric vehicles.

BACKGROUND

A hybrid electric vehicle (HEV) includes two power sources for delivering power to propel the vehicle. Typically, the first power source is an internal combustion engine which consumes fuel and the second power source is a battery which stores and uses electricity.

SUMMARY

The fuel economy of a hybrid electric vehicle (HEV) can be improved for a given traveling route or path if the battery usage is adapted for the route or path. In accordance with embodiments of the present invention, the control of a HEV (including non-plug-in and plug-in HEVs) is tied to a route to be traveled in order to reduce fuel consumption and thereby improve fuel economy. Utilizing available route information including road characteristics, vehicle conditions, and traffic conditions, the battery charging and discharging can be optimized for the route. The proliferation of navigation systems and digital maps in modern vehicles can facilitate the application of such path dependent control methods for HEVs.

Embodiments of the present invention seek to improve the fuel economy of a HEV for a route to be traveled by optimizing the charging and discharging of the battery depending on the route. In accordance with embodiments of the present invention, a route to be traveled by the vehicle is segmented into a series of route segments. Properties of each route segment such as length, grade, and vehicle speed trajectories or patterns are known or expected. To this end, the route is decomposed into the series of route segments such that each node where one route segment ends and where another route segment begins corresponds to the initiation of a significant change in a characteristic(s) of the route. Such route characteristics include vehicle speed, road grade, presence of stop signs or traffic lights, traffic congestion, and the like.

As the vehicle starts traveling from the beginning of a current route segment, a virtual route based on the remaining portion of the route to be traveled (i.e., the original route left-to-go) is generated. The virtual route has the same total length as the original route left-to-go. The virtual route differs from the original route left-to-go by having a smaller amount of route segments than the original route left-to-go. In particular, one of the route segments of the virtual route represents multiple route segments of the original route left-to-go.

An optimized sequence of battery state-of-charge (SoC) set-points for the route segments of the virtual route is generated. The battery SoC set-points are optimized in the sense that the fuel consumption of the vehicle in traveling the original route left-to-go will be minimized, taking into account other considerations such as charge sustainment, in response to the battery being controlled in accordance with the battery SoC set-points. The battery SoC set-points may be generated based on one or more properties of the route segments of the virtual route including the virtual route segment that represents multiple segments of the original route left-to-go. The battery is controlled while the vehicle is traveling along the current route segment of the original route left-to-go in accordance with the battery SoC set-point for the first route segment of the virtual route.

The virtual route generation and battery SoC set-point optimization are repeated as the vehicle travels along the route and reaches the beginning of each new route segment. For instance, when the vehicle has finished traveling over the current route segment and begins traveling along the next route segment of the original route left-to-go, a second virtual route based on what is now the remaining portion of the actual route is generated. In turn, an optimized sequence of battery SoC set-points for the route segments of the second virtual route is generated. The battery is controlled while the vehicle is traveling along the next route segment (which is now the current route segment) of the updated original route left-to-go with the battery SoC set-point for the first route segment of the second virtual route.

As described, embodiments of the present invention are based on a Receding Horizon Control (RHC) algorithm for prescribing battery SoC set-points to the battery of a HEV traveling along a route. As the vehicle travels along the route, the original route left-to-go, which perhaps has a relatively large amount of route segments, is replaced by a virtual route having a relatively small amount of route segments. The battery SoC set-point optimization is performed for the virtual route instead of for the original route left-to-go. As the virtual route has a smaller amount of route segments than the original route left-to-go, the battery SoC set-point optimization is performed faster for the virtual route than it would be performed for the original route left-to-go. The first element of the optimized battery SoC sequence for the virtual route is then applied as the battery SoC set-point for the current route segment of the original route left-to-go. That is, the battery of the vehicle is controlled according to the first element of the optimized battery SoC sequence for the virtual route as the vehicle travels along the current route segment of the original route left-to-go. The virtual route generation and battery SoC set-point optimization are repeated for each new (i.e., next) route segment as the vehicle travels along the actual route.

In an embodiment, a method is provided. The method includes segmenting an original route into segments. The method further includes generating a virtual route based on the remaining portion of the original route once a hybrid electric vehicle (HEV) reaches a current segment of the original route. The virtual route includes a first segment corresponding to the current segment of the original route and a last segment representing at least two other segments of the remaining portion of the original route. The method further includes generating battery SoC set-points for the segments of the virtual route. The method further includes controlling the vehicle according to the battery SoC set-point for the first segment of the virtual route as the vehicle travels along the current segment of the original route.

In an embodiment, a system is provided. The system includes a controller configured to carry out the operation of the method set forth above.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
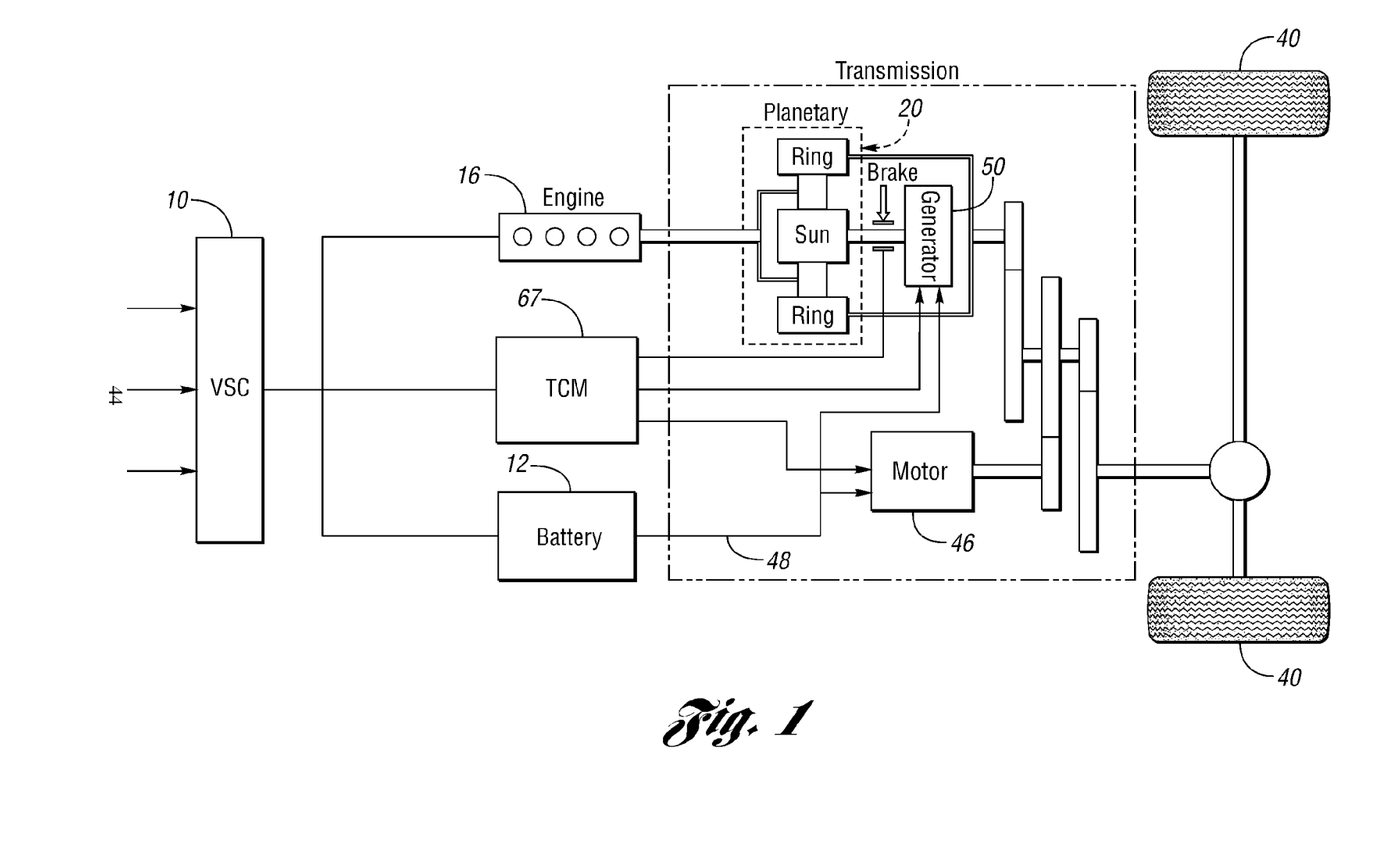
FIG. 1 illustrates a block diagram of a hybrid electric vehicle (HEV) in accordance with embodiments of the present invention.

Referring now to FIG. 1, a schematic representation of a hybrid electric vehicle (HEV) in accordance with embodiments of the present invention is shown. The basic components of the HEV powertrain include an internal combustion engine 16, an electric battery 12, a power split device referred to as a planetary gear set 20, an electric motor 46, and an electric generator 50. The HEV powertrain has a power-split configuration. This configuration allows engine 16 to directly drive wheels 40 and at the same time charge battery 12 through generator 50. Both motor 46 and engine 16 can drive wheels 40 independently.

Engine 16 is connected to generator 50 through planetary gear set 20. Battery 12 is connected to motor 46 and generator 50. Battery 12 can be recharged or discharged by motor 46 or generator 50 or both. Planetary gear set 20 splits the power produced by engine 16 and transfers one part of the power to drive wheels 40. Planetary gear set 20 transfers the remaining part of the power to generator 50 in order to either provide electrical power to motor 46 or to recharge battery 12.

Engine 16 can provide mechanical power to wheels 40 and at the same time charge battery 12 through generator 50. Depending on the operating conditions, engine 16, motor 46 (which consumes electric energy stored in battery 12), or both can provide power to wheels 40 to propel the vehicle. The vehicle also incorporates a regenerative braking capability to charge battery 12 during vehicle deceleration events. As described, there are several degrees of freedom in this powertrain configuration to satisfy driver requests. This flexibility can be exploited to optimize fuel consumption.

A hierarchical vehicle system controller 10 coordinates subsystems in the HEV. Controller 10 is used to capture all possible operating modes and integrate the two power sources, engine 16 and battery 12, to work together seamlessly and optimally as well as to meet the driver's demand. Controller 10 is configured to send control signals to and receive sensory feedback information from one or more of battery 12, engine 16, motor 46, and generator 50 in order for power to be provided to wheels 40 for propelling the vehicle.

Controller 10 controls the power source proportioning between battery 12 and engine 16 to provide power to propel the vehicle. As such, controller 10 controls the charging and discharging of battery 12 and thereby controls the state of charge (SoC) of battery 12. Inherent to controller 10 is a logical structure to handle various operating modes and a dynamic control strategy associated with each operating mode to specify the vehicle requests to each subsystem. A transmission control module (TCM) 67 transmits the commands of controller 10 to motor 46 and generator 50.

Figure 2:
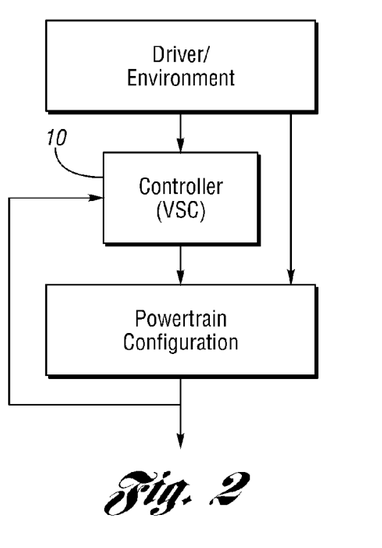
FIG. 2 illustrates a block diagram of the input and output configuration of the vehicle system controller of the HEV.

As shown in FIG. 2, controller 10 takes as inputs environmental conditions, the driver's requests, and the current state of the vehicle and provides outputs commands such as torque and speed commands for the powertrain components of the vehicle. The powertrain then follows the commands of controller 10.

In order to handle path-dependent control in accordance with embodiments of the present invention, controller 10 is extended with additional functionality to optimize fuel consumption. In particular, the environmental condition inputs for controller 10 include road length, road grade, and vehicle speed of a route to be traveled by the vehicle. The current state of the vehicle as represented by the SoC of battery 12 is also an input to controller 10. In order to improve fuel economy, controller 10 controls the transitions from charging to discharging mode and the durations of charging and discharging periods. Towards this goal, controller 10 generates the battery SoC set-points for the route and tracks the battery SoC in order to realize these charging and discharging transitions that result in fuel efficient travel.

Ideally, battery SoC set-points would be prescribed for every moment of travel along the route. However, to simplify the computations, the route is segmented into route segments. A virtual route representing the original route left-to-go is generated each time the vehicle moves from one route segment to the next route segment. Each virtual route contains less route segments than the corresponding original route left-to-go. Battery SoC set-points are prescribed based on each virtual route. The battery is controlled while the vehicle is traveling along each current route segment with the battery SoC set-point for the first route segment of the corresponding virtual route. The segmentation enables controller 10 to accurately track the corresponding battery SoC before the end of a route segment.

Figure 3:
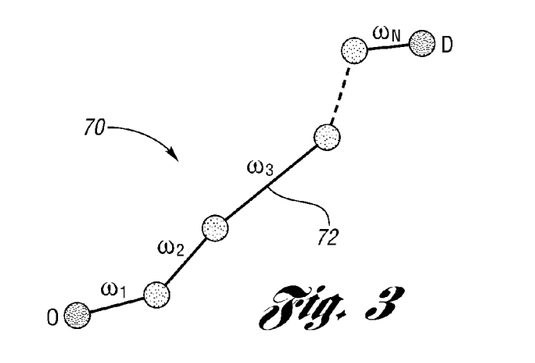
FIG. 3 illustrates an original route segmented into route segments in accordance with embodiments of the present invention.

FIG. 3 illustrates an original route 70 to be traveled segmented into a series of route segments 72 in accordance with embodiments of the present invention. Original route 70 links an origin O to a destination D. In accordance with embodiments of the present invention, original route 70 is known in advance by being predicted, expected, forecasted, driver-specified, etc. Original route 70 is segmented into a series of i=1, . . . , N route segments 72 connected to one another. Thus, original route 70 includes a total of N route segments 72. In FIG. 3, the w, designates the fuel consumed over the ith route segment.

Each route segment 72 has a length $l_i$, a road grade $g_i$, and a vehicle speed $v_i$. This information for each route segment 72 is available (e.g., known or predicted) in advance of the vehicle traveling along the route segment. The road grade and vehicle speed for each route segment are generally functions of distance and time. The road grade is a deterministic quantity which can be known in advance as a function of distance. With respect to modeling the vehicle speed, it is assumed that a nominal vehicle speed trajectory can be predicted for each route segment, possibly dependent on the characteristics of the route segment and traffic in the route segment.

In accordance with embodiments of the present invention, the route segmentation criteria generally relate to substantial changes in characteristics of the route such as the average road grade or the average vehicle speed. Such changes in the road grade may correspond to the beginning or end of a hill. Such changes in the vehicle speed may coincide with the changes in the road class, vehicle deceleration to or acceleration from stop signs or traffic lights, or to traffic conditions. The route segmentation criteria may also relate to the ability of controller 10 to track battery SoC set-points within a route segment. As such, route segments 72 will have different lengths from one another in order to provide more efficient aggregation of the relevant road conditions.

Consequently, a constant average road grade $g_i$ can be assumed in each route segment and a varying nominal vehicle speed trajectory $v_i$ is considered in each route segment. Such a representative vehicle speed trajectory (a scenario) may be chosen consistently with a finite set of statistical features (mean, variance, etc.) which are considered to be properties of traffic on a particular route segment or type of driver.

The state-of-charge (SoC) of battery 12 is a key dynamic state in the system. The value of the battery SoC at the beginning of the ith route segment is denoted as $SoC_i$ and the value of the battery SoC at the end of the ith route segment is denoted as $SoC_{i+1}$. The value of the battery SoC set-point for the ith route segment is denoted as $SoC_d(i)$. Controller 10 controls the battery SoC in the ith route segment in response to the battery SoC set-point $SoC_d$ for the ith route segment.

The expected fuel consumption w, in the ith route segment is thus a function of $g_i$, $v_i$, $l_i$, $SoC_i$, and $SoC_d(i)$, i.e., $$\omega_i(g_i,v_i,l_i,SoC_i,SoC_d(i))=E\{f(g_i,v_i,l_i,SoC_i,SoC_d(i))\} \quad \text{(equation 1)}$$

E denotes the expected value. The expectation is used in equation 1 because the actual vehicle speed trajectory is generally not deterministic and can deviate from the nominal trajectory (e.g., due to different driver and traffic situations) and hence the fuel consumption is a random variable. In particular, although the grade, the nominal vehicle speed, and the length of a route segment are deterministic quantities, the vehicle speed trajectory over the route segment is not. Different drivers may produce different vehicle speed profiles while maintaining the same average speed. Even the same driver will not be able to regenerate completely accurately a previously realized vehicle trajectory. Environmental conditions including severe weather and traffic situations and even the personality and mood of the driver may affect the vehicle speed trajectory on trips. Therefore, vehicle speed trajectory is a probabilistic quantity. Consequently, even though a nominal speed on a route segment or a more realistic speed model is given, this information is not sufficient to compute a reliable value for the fuel consumption along a route segment. Thus, a value representative enough for every type of driver and every environmental situation has to be considered for the fuel consumption of a route segment. An appropriate way to satisfy this goal is to consider the expected value of the fuel consumption over multiple probabilistic realizations of vehicle speed. Accordingly, a large amount of speed trajectories around an originally given speed model is generated probabilistically for each route segment. For all of those speed trajectories, the corresponding fuel consumption (i.e., $\{f(g_i, v_i, l_i, SoC_i, SoC_d(i))\}$) is computed. The expected value (i.e., $E \{f (g_i, v_i, l_i, SoC_i, SoC_d(i))\}$) of those fuel consumptions is the representative fuel consumption of the route segment that will be provided as an optimization algorithm input as described herein.

As indicated above, controller 10 includes a high-level portion which prescribes the battery SoC set-points for the route. The upper-level controller can vary the battery SoC set-point as a function of time. While this may be feasible over a short planning horizon, over longer planning horizons the computational effort may be large. Furthermore, route information may only be available in aggregated/averaged form over a continuous route portion. Thus, in accordance with embodiments of the present invention, a route to be traveled is segmented into route segments (as shown in FIG. 3) and, as the vehicle travels along the route, battery SoC set-points are prescribed for each route segment.

As further indicated above, controller 10 includes a lower-level portion which controls power flows within the HEV to satisfy the driver power request and ensure that the battery SoC tracks the specified SoC set-point. The lower-level controller takes as inputs the battery SoC at the beginning of a route segment, the grade of the route segment, the vehicle speed of the route segment, the length of the route segment, and the target battery SoC at the end of the route segment (prescribed by the upper-level controller). Of course, the lower-level controller also receives as inputs typical vehicle information such as driver power request, auxiliary power loads, motor speed, engine speed, etc. Based on the inputs, the lower-level controller generates torque and speed commands for the HEV components to ensure tracking of the battery SoC set-point for the route segment. As indicated, a route segmented in accordance with embodiments of the present invention will likely have route segments of different lengths in order to provide more efficient aggregation of the relevant route conditions.

As indicated above, for a route segmented into N route segments with certain properties of each route segment being known, controller 10 has the ability to prescribe a sequence of battery SoC set-points $\{SoC_d(i), i=1, \ldots, N\}$ for the route to minimize the total fuel consumption. The sequence of battery SoC set-points is generated based on the known properties of the route segments. Controller 10 further has the ability to control the battery SoC in the ith route segment in response to the battery SoC set-point $SoC_d(i)$ for the ith route segment.

Let i be the current node and the beginning of the ith route segment, $i=1,2, \ldots, N+1$, where $i=1$ and $i=N+1$ represent, respectively, the origin and destination nodes of the route. Controller 10 incorporates a control law which is a function of the state vector x(i) with two components: the segment/node i and the state of charge $SoC_i$ at that node. The state dynamics are:

$$x(i+1) = F(x(i), SoC_d(i)), \text{ and} \quad \text{(equation 2)}$$

$$x(i) = \begin{pmatrix} i \\ SoCi \end{pmatrix}.$$

The state at the current node is x(i). F is a nonlinear function which generates a successor state from the precedent state.

The objective of minimizing the total fuel consumption along the route can be formulated as follows:

$$\min J[SoC_d(i)]=\Sigma_{i=1}^N \omega_i \quad \text{(equation 3)}$$

subject to $SoC_{min} \leq SoC_{i+1} \leq SoC_{max}$ and subject to $SoC_{N+1}=SoC_D$.

J is the objective function of the optimization problem. $SoC_d(i)$ ($i \in \{1,2,3, \ldots N\}$) are the manipulated variables. $SoC_{min}$ and $SoC_{max}$ are respectively the minimum and maximum SoC limits. J is a stage-additive cost function and the stage cost reflects the expected fuel consumption in each route segment i. The constraint $SoC_{N+1}=SoC_D$ is an optional constraint to match the battery SoC to the desired battery SoC value at the end of the route. The choice $SoC_D=SoC_O$ ensures that the battery charge is sustained over the route.

The optimization algorithm employed by controller 10 translates the property of any final part of an optimal trajectory to be optimal with respect to its initial state into a computational procedure in which the cost-to-go function $J^*(x)$ can be recursively computed and satisfies the following relationships:

$$J^*(x)=\min[SoC_d]\{J^*(F(x, SoC_d))+\omega(x, SoC_d)\}, \text{ and} \quad \text{(equation 4)}$$

$$J^*(x_f)=0. \quad \text{(equation 5)}$$

$J^*$ is the value function in the optimization problem. $SoC_d=SoC_d(x)$ is the manipulated variable. $x=[i, SoC]^T$ is the state vector with the elements being the route segment number i, i=1, ..., N and the battery SoC at the beginning of the segment. The vector $x_f$ represents the final state, which is the state at the destination. F is a nonlinear state transition function, which generates the next state from the precedent one. If the battery set-point $SoC_d$ is feasible, then for $x=[i, SoC]^T$ it follows that $F(x, SoC_d)=[i+1, SoC_d]^T$. The variable $\omega(x, SoC_d)$ denotes the expected fuel consumption for the state x and the battery SoC set-point $SoC_d$.

For on-line implementation, a regression model may be used to estimate the expected fuel consumption $\omega(x, SoC_d)$ as a function of battery $SoC=x(2)$ at the beginning of the segment, battery SoC set-point $SoC_d$ within the segment, and i=x(1)th segment properties (grade, length, features of vehicle speed trajectory such as average, maximum, and minimum speeds and accelerations, etc.). The fuel consumption model may also include a dependence on the driver style (passive or aggressive) which may be inferred on-line from the variance of acceleration pedal input and vehicle speed. Either vehicle measurement data over different roads or the results of vehicle simulations may be used to develop such a fuel consumption model.

For a given battery SoC at the beginning of the ith segment, not all $SoC_d$ are feasible, i.e, can be tracked within a tolerance of 0.5 percent before the end of the segment. Such infeasible values of $SoC_d$ are eliminated from the optimization by artificially assigning a high value to the fuel consumption. Thus, only battery SoC set-points that can be accurately tracked before the end of each road segment are considered for prescription.

Figure 4:
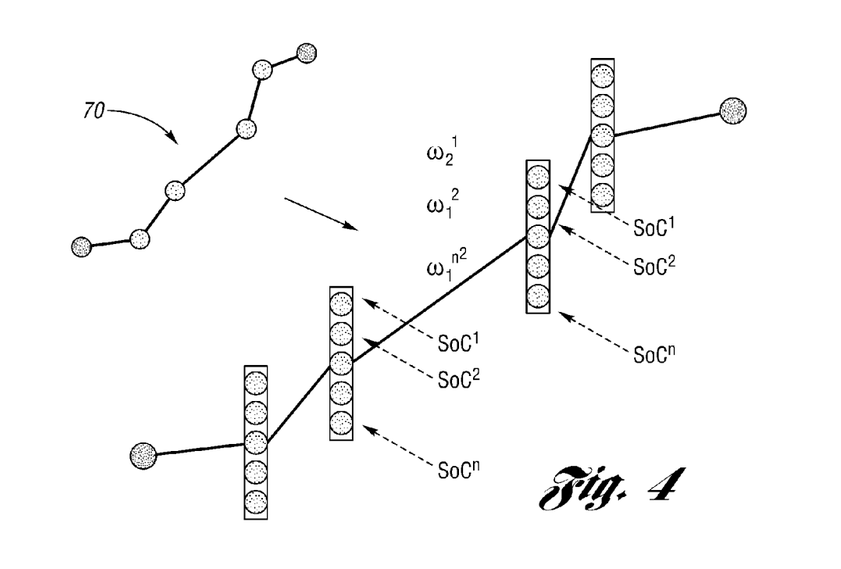
FIG. 4 illustrates state-of-charge (SoC) quantization for the nodes of a segmented route in accordance with battery SoC set-point optimization for the route as a whole.

Given that battery SoC is a continuously-valued quantity, for the numeral implementation of the optimization, the values of battery SoC are quantized. With a quantization of the form $SoC_i \in \{SoC^1, SoC^2, ... SoC^n\}$ with $SoC^1 \leq SoC^2 \leq ... \leq SoC^n$, every segment i of the route can be associated with $n^2$ possible pairs of initial SoC and final SoC, i.e., $(SoC_i, SoC_{i+1})$, and thus with $n^2$ possible values for the expected fuel consumption was shown in FIG. 4.

Figure 5:
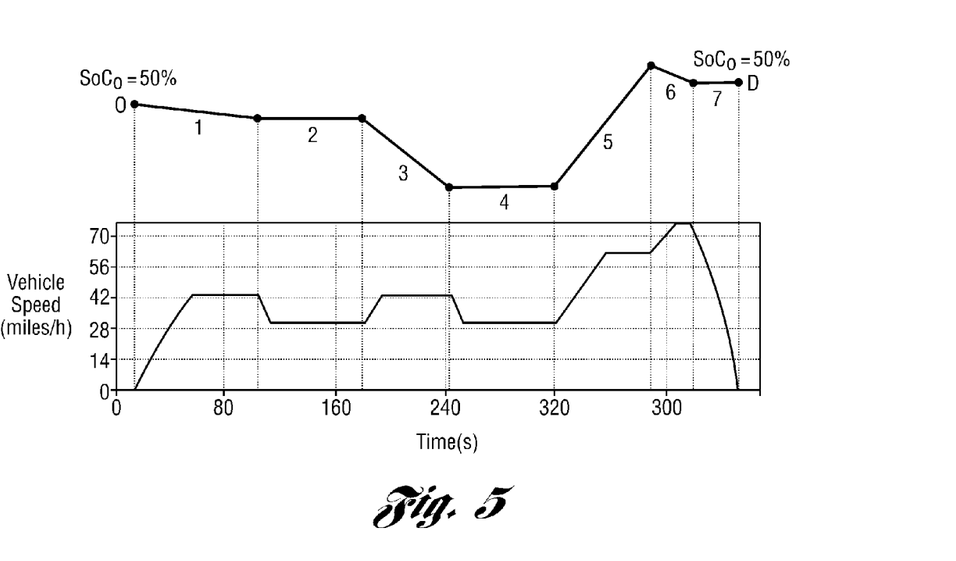
FIG. 5 illustrates a graph of the vehicle speed trajectories for the route segments of a sample route used to quantify potential benefits of path-dependent control in accordance with battery SoC set-point optimization for the sample route as a whole.

A case study of the battery SoC set-point optimization for a route as a whole will now be described. A sample route was segmented into seven route segments (i.e., N=7). The route is assumed to have zero road grade. Length information for each route segment and the vehicle speed trajectory in each route segment were assumed to be available and known in advance. Table I below indicates the length and road grade of each route segment. FIG. 5 illustrates a graph of the vehicle speed trajectory in each route segment. As illustrated, the vehicle speed trajectory for the entire route includes ramp-like changes and constant vehicle speed intervals.

TABLE I

| | Segment | | | | | | |
|---|---|---|---|---|---|---|---|
| | 1 | 2 | 3 | 4 | 5 | 6 | 7 |
| Length (miles) | 0.87 | 0.68 | 0.74 | 0.98 | 1.02 | 0.59 | 0.42 |
| Grade (%) | 0 | 0 | 0 | 0 | 0 | 0 | 0 |

The battery SoC at the route origin (i.e., at the beginning of route segment (1)) is $SoC_O$=50%. To sustain the charge in battery 12, the desired battery SoC at the route destination (i.e., at the end of route segment (7)) is $SoC_D$=50%. The values of $SoC_{min}$ and $SoC_{max}$ were set to 40% and 60%, respectively.

Table II below compares the fuel consumption with the battery SoC set-point optimization for the route as a whole (referred to as "whole route optimization") and the fuel consumption with the battery SoC set-point being maintained at 50% in each route segment (referred to as "No SoC Control"). The fuel consumption (0.32 kg) when the battery is controlled in accordance with the battery SoC set-point whole route optimization is about 13.5% lower than the fuel consumption (0.37 kg) when the battery SoC is maintained constant over the entire route. This fuel consumption reduction benefit is specific to the selected route and the potential benefits of varying battery SoC set-point within the route may be different depending on the route.

As further indicated in Table II, the prescribed battery SoC set-point sequence is "50-52-50-48-46-46-44-50". As such, the battery SoC set-point for the $1^{st}$ and $8^{th}$ nodes (i.e., the origin and destination) is 50%. The battery SoC set-points for the $2^{nd}$ through $7^{th}$ nodes are 52%, 50%, 48%, 46%, 46%, and 44%, respectively.

TABLE II

| FUEL SAVINGS 13.5% | Total Fuel Consumption (kg) | $SoC_d$ sequence (%) |
|---|---|---|
| No SoC control | 0.37 | 50-50-50-50-50-50-50-50 |
| whole route optimization | 0.32 | 50-52-50-48-46-46-44-50 |

The battery SoC set-point whole route optimization approach (i.e., a single prescription of a sequence of battery SoC set-points for a route segmented into N route segments $\{SoC_d(i), i=1, ..., N\}$ with the battery SoC in the ith route segment to be controlled pursuant to the battery SoC set-point $SoC_d(i)$ for the ith route segment) is helpful in delineating potential benefits of adjusting battery SoC set-points according to the route being traveled. In implementing the whole route optimization approach, two issues need to be considered. The first issue involves computing effort. The second issue involves dependence on route characteristics which may not be accurately known in advance.

The computing effort of the whole route optimization approach depends on the number of states in the model. As described, the model used for optimization had only a single vehicle state (namely, the battery SoC). Hence, computing the optimal control on-line using the whole route optimization approach may be feasible for routes with relatively few route segments. However, the whole route optimization approach may become computationally prohibitive for on-board applications if the route contains relatively many route segments. Since route segmentation is based on changes in road and traffic conditions in accordance with embodiments of the present invention, routes over which optimization needs to be performed may contain a relatively large amount of route segments.

The second issue of the whole route optimization approach deals with the fact that although only a prediction of the route with anticipated driving characteristics along the route segments are available, the characteristics of the route actually traveled may turn out to be different. Variability in road and traffic conditions or in the driver's choices may result in such deviations. Therefore, the control policy for the whole route optimization approach has to either be regularly re-computed or corrected to account for these changes.

In order to address the noted issues of the whole route optimization approach, embodiments of the present invention provide a Receding Horizon Control (RHC) optimization approach as an alternative.

A general description of the RHC optimization approach is as follows. Assume that a HEV travels along a route L having N segments, where N is relatively large. Suppose the vehicle is currently at the beginning of the kth segment of the route. The remaining part of the route L(k) is the original route left-to-go and has N−k route segments. That is, the remaining part of the route L(k) is the original route minus the route segments already traveled. A virtual route L'(k) is generated to replace the original route left-to-go. The virtual route has $n_c+1$ route segments, where $n_c \ll N$. In the virtual route, each of the $n_c$ segments correspond to respective ones of the segments of the original route left-to-go. The $(n_c+1)$ segment of the virtual route is a virtual terminal segment. In particular, the $n_c$ segments of the virtual route are the initial $n_c$ segments of the virtual route and are taken from the initial $n_c$ segments of the original route left-to-go. For instance, if $n_c=2$, then first and second segments of the virtual route are the initial two segments of the virtual route and are taken from the first and second segments, respectively, of the original route left-to-go. The $(n_c+1)$ segment (i.e., the virtual terminal segment) of the virtual route is the last segment of the virtual route and represents all of the segments of the original route left-to-go following the $n_c$ segments of the original route left-to-go. The virtual terminal segment (e.g., the $(n_c+1)$ segment of the virtual route) represents, on average, the characteristics of the last $N-k-n_c$ segments of the original route.

After the virtual route L'(k) is generated, an optimized sequence of battery SoC set-points $\{SoC^*_d(l), l=1, 2, \ldots, n_c+1\}$ is generated using the optimization approach on the virtual route L'(k). That is, the optimization is done for a virtual route containing only $n_c+1$ route segments as opposed to being done for the original route left-to-go containing N−k route segments (and as opposed to being done for the route as a whole containing N route segments). As a result, the optimization may be performed relatively fast and in an on-board manner as there are relatively few route segments involved in the optimization computations. After the optimization for the virtual route L'(k) is completed, the assignment $SOC_d(k)=SoC^*_d(1)$ is made (i.e., the battery SoC set-point for the kth segment of the actual route is assigned to be the battery SoC set-point for the first segment of the virtual route).

Again, recall that the vehicle is currently at the beginning of the kth segment of the route. Once the vehicle progresses to the beginning of the next route segment (i.e., the (k+1) route segment), the virtual route generation and optimization processes are repeated. At this point, the vehicle is at the beginning of the k+1 segment of the route and the original route left-to-go has N−k−1 route segments. A second virtual route having $n_c+1$ route segments is then generated. The virtual terminal segment (i.e., the $n_c+1$ segment of the second virtual route) represents, on average, the characteristics of the omitted $N-k-1-n_c$ segments of the original route. An optimized sequence of battery SoC set-points $\{SoC^*_d(l), l=1, 2, \ldots, n_c+1\}$ is generated using the optimization approach on the second virtual route. The assignment $SOC_d(k)=SoC^*_d(1)$ is then made (i.e., the battery SoC set-point for the k+1 segment of the actual route is assigned to be the battery SoC set-point for the first segment of the second virtual route).

The virtual route generation and optimization processes are repeated as the vehicle progresses to the beginning of subsequent route segments until a route segment corresponding to a sufficiently large value of k is reached for which L(k) consists of just $n_c+1$ route segments (the value k being incremented each time a new current route segment begins). At this point, optimization is solved for this remaining part of the actual route.

With the Receding Horizon Control (RHC) approach, optimization is performed over a route with $n_c+1$ segments and thus requires significantly less computing time and effort compared with whole route optimization (assuming $n_c \ll N$). Further, with the RHC approach, characteristic changes of the route being traveled can be accounted for as a result of the optimization being repeated at the beginning of new route segments.

Figure 6:
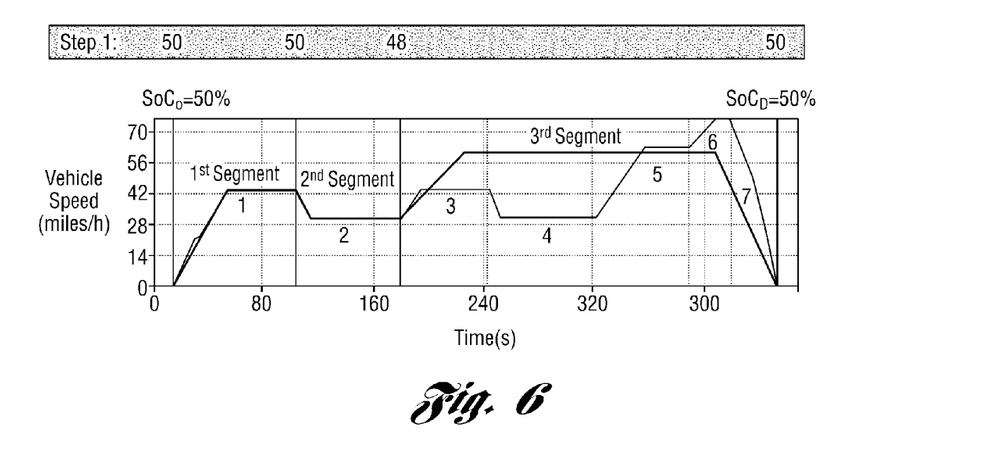
FIG. 6 illustrates a graph describing operation of a Receding Horizon Control (RHC) algorithm in accordance with embodiments of the present invention.

With reference to FIG. 6, an example of the RHC approach will be described. This example uses the same sample route described above with reference to FIG. 5. As described, the sample route is segmented into N=7 route segments. In this application of the RHC approach, the horizon ($n_c$) is chosen to be two segments (e.g., $n_c=2$). Thus, a three segment route is considered and optimized at each step of the approach. The three segment route includes the current segment, the next segment, and a virtual third segment. The virtual third segment represents on average the remaining part of the original route (i.e., the original route left-to-go) following the current and next segments.

The starting point is with the vehicle at the beginning of the route (i.e., at the beginning of route segment (1)). At this point, the original route left-to-go is the original route itself as the vehicle has just started traveling from the beginning of the route. A virtual route having three segments is generated according to the RHC approach. The first and second segments of the virtual route are the first and second segments of the original route, respectively. The third segment of the virtual route is a virtual terminal segment. The virtual terminal segment is characterized by the total length, the average speed, and the average grade of the remaining route segments of the original route (i.e., the $3^{rd}$, $4^{th}$, $5^{th}$, $6^{th}$, and $7^{th}$ segments of the original route). The virtual terminal segment includes acceleration and deceleration portions from initial to final vehicle speed values (see FIG. 6).

Next, according to the RHC approach, an optimized sequence of battery SoC set-points is generated using the optimization approach on the three-segment virtual route in order to obtain a battery SoC sequence that minimizes fuel consumption. This optimization results in 50→50→48→50 as the optimal battery SoC sequence (also shown in FIG. 6). This sequence suggests that 50% should be used as the battery SoC target on the first segment. Thus, the battery SoC is controlled to be maintained at 50% (as the initial battery SoC was 50% at the beginning of the first route segment). When the vehicle arrives at the beginning of the next route segment (i.e., the second route segment), the virtual route generation and battery SoC optimization are repeated.

This subsequent iteration at the beginning of the next route segment is similar to the initial iteration with the difference being that the route over which optimization is to be performed has changed. In particular, the beginning of the original route left-to-go now coincides with the beginning of the second route segment. The original route left-to-go at this point includes the segments 2 through 7 and does not include the first segment as the vehicle is at the beginning of the second segment having already traveled over the first route segment. A second virtual route having three segments is generated. The second virtual route includes the $2^{nd}$ and $3^{rd}$ segments of the original route and includes a second virtual terminal segment. The second virtual terminal segment is characterized by the total length, the average speed, and the average grade of the remaining route segments of the original route (i.e., the $4^{th}$, $5^{th}$, $6^{th}$, and $7^{th}$ segments of the original route). Next, an optimized sequence of battery SoC set-points is generated using the optimization approach on the second virtual route in order to obtain a battery SoC sequence that minimizes fuel consumption. The first element of the optimized battery SoC set-point sequence is set as the battery SoC set-point for the second segment of the route.

The procedure continues until the final iteration is reached where the vehicle has to travel just three segments until reaching the destination. At this point, the route-to-optimize includes the last three segments of the original route and the optimal SoC sequence is simply computed for the route consisting of the last three segments of the original route.

A case study of the Receding Horizon Control (RHC) approach in accordance with embodiments of the present invention will now be described. This study illustrates the results of the RHC approach and presents a comparison with the battery SoC optimization for a route as a whole approach ("whole route optimization"). This study uses the same sample route described with reference to FIG. 5. Again, the grade of the entire route is zero and the SoC at the origin and destination is set to be 50%.

Table III summarizes the effect that the RHC and whole route optimization approaches have on fuel consumption. When the battery SoC set-point is not varied the total fuel consumption is 0.37 kg. With the RHC optimization approach the total fuel consumption is 0.33 kg. With the whole route optimization approach the total fuel consumption is 0.32 kg. The RHC optimization approach thus achieves a substantial fraction of the benefit of the whole route optimization approach for this particular route.

TABLE III

| | Fuel Consumption | $SoC_d$ sequence (%) | Fuel Savings (%) |
|---|---|---|---|
| No SoC control | 0.37 | 50-50-50-50-50-50-50-50 | 0 |
| RHC optimization | 0.33 | 50-50-48-52-50-50-44-50 | 10.8 |
| whole route optimization | 0.32 | 50-52-50-48-46-46-44-50 | 13.5 |

As shown in Table III, the two methods (RHC and whole route optimization) produce different SoC sequences. This is because at the beginning of each new route segment the RHC optimization approach optimizes the fuel consumption over a virtual route which is an approximation of the route left-to-go. On the other hand, the whole route optimization approach performs a single optimization for the entire route.

Another case study of the RHC optimization approach in accordance with embodiments of the present invention will now be described. In this study, the same sample route is used again. However, a grade of 1% is inserted at the fourth segment and a grade of −1% is inserted at the sixth segment. The rest of the sample route characteristics remain unchanged. Table IV summarizes the improvement of fuel economy that RHC and whole route optimization have on fuel consumption when the grade is not zero along the entire route. When the battery SoC set-point is not varied the total fuel consumption is 0.37 kg. As such, although the grade of the route has changed, the total fuel consumption has not. This can be explained as the average grade of the entire route is slightly positive, but still very close to zero. With the RHC optimization approach the total fuel consumption has increased to 0.34 kg. With the whole route optimization approach the total fuel consumption has increased to 0.33 kg. These results indicate that the RHC optimization approach is able to reduce fuel consumption and attain a significant fraction of the achievable benefit given by the whole route optimization approach.

TABLE IV

| | Total fuel consumption kg | $SoC_d$ (%) | Fuel Savings (%) |
|---|---|---|---|
| No SoC control | 0.37 | 50-50-50-50-50-50-50-50 | 0 |
| RHC optimization | 0.34 | 50-50-48-54-52-46-44-50 | 8.1 |
| whole route optimization | 0.33 | 50-52-50-54-48-48-44-50 | 10.8 |

As described, the RHC optimization approach is computationally faster than the whole route optimization approach. The RHC optimization approach enables on-board optimization for fuel consumption benefits. The RHC optimization approach is able to incorporate changes in the route information during the trip, e.g., changes in traffic information, when re-optimizing the control solution. Although certain segment characteristics, such as grade and distance, can be considered as deterministic quantities, the vehicle speed trajectories of different tripe over the same segment are not. Factors such as weather and traffic conditions or even the personality and mood of the driver may affect the speed trajectory. The ability of the RHC optimization approach to account for these changes while providing a significant fraction of the fuel consumption reduction benefits as compared to the whole route optimization approach is thus beneficial.

As described, embodiments of the present invention are directed to a Receding Horizon Control (RHC) optimization approach to path-dependent control of a HEV for reduced fuel consumption. In the RHC optimization approach, a route with a relatively large amount of segments is replaced by a virtual route having relatively few segments. The segments of the virtual route other than the last segment of the virtual route correspond one-to-one with the initial segments of the original route left-to-go. The last segment of the virtual route is a virtual terminal segment. The virtual terminal segment represents on average all of the last remaining segments of the original route left-to-go. Each segment is characterized by its length, grade, average speed, and possibly other parameters which permit an estimate of the expected fuel consumption over the segment. The optimal battery state-of-charge (SoC) set-point sequence, which minimizes the expected fuel consumption, is determined for the virtual route. The first element of the optimal battery SoC set-point sequence for the virtual route is applied for the current segment of the original route left-to-go. During travel along the route, the battery SoC optimization is recomputed at the beginning of each segment of the actual route until the end of the route is reached.

While exemplary embodiments are described above, it is not intended that these embodiments describe all possible forms of the present invention. Rather, the words used in the specification are words of description rather than limitation, and it is understood that various changes may be made without departing from the spirit and scope of the present inven-

What is claimed is:

1. A system comprising:
a controller configured to segment an original route into segments with each segment having a characteristic different than neighboring segments, generate a virtual route based on the remaining portion of the original route once a vehicle reaches a current segment of the original route, wherein the virtual route includes a first segment corresponding to the current segment and a virtual segment representing at least two other segments of the remaining portion of the original route, wherein the characteristic of the virtual segment is an average of the characteristics of the at least two other segments of the remaining portion of the original route;
the controller further configured to generate battery state-of-charge (SoC) set-points for the segments of the virtual route based on each of the characteristics of each of the segments of the virtual route including the first segment and the virtual segment and control the vehicle according to the battery SoC set-point for the first segment of the virtual route as the vehicle travels along the current segment.

2. The system of claim 1 wherein:
the controller is further configured to repeat the generation of a virtual route based on the remaining portion of the original route as the vehicle reaches each new segment of the original route, repeat the generation of battery SoC set-points for the segments of each virtual route, and control the vehicle according to the battery SoC set-point for the first segment of each virtual route as the vehicle travels along each new segment of the original route.

3. The system of claim 1 wherein:
the original route includes N segments and the virtual route includes $n_{c}+1$ segments, wherein N and $n_c$ are integers;
wherein the controller is further configured to enable selection of the value of $n_c$ subject to the constraint that N is greater than $n_c$.

4. The system of claim 3 wherein:
when $n_c$ equals one, the $n_c$ segment is the first segment of the virtual route and corresponds to the current segment of the original route and the $n_c+1$ segment of the virtual route is the last segment of the virtual route and represents the at least two other segments of the remaining portion of the original route.

5. The system of claim 3 wherein:
when $n_c$ is greater than one, the $n_c$ segments of the virtual route includes the first segment of the virtual route which corresponds to the current segment of the original route and the $n_c+1$ segment of the virtual route is the last segment of the virtual route which represents the last $(N-k-n_c)$ segments of the remaining portion of the original route where k is the numerical order value of the current segment of the original route.

6. The system of claim 3 wherein:
the controller is configured to generate the battery SoC set-points for the segments of the virtual route such that the battery SoC set-point for the first segment of the virtual route is based on at least one of the length of each of the initial $n_c$ segments and the last $n_c+1$ segment of the virtual route, the average vehicle speed along each of the initial $n_c$ segments and the last $n_{c+}1$ segment of the virtual route, the average road grade of each of the initial $n_c$ segments and the last $n_c+1$ segment of the virtual route, and the battery SoC at the beginning of each of the initial $n_c+1$ segments and the last $n_c+1$ segment of the virtual route.

7. The system of claim 3 wherein:
the controller is configured to repeat the generation of a virtual route based on the remaining portion of the original route once the vehicle reaches each new segment of the original route, repeat the generation of battery SoC set-points for the segments of each virtual route, and control the vehicle according to the battery SoC set-point for the first segment of each virtual route as the vehicle travels along each new segment of the original route;
wherein the controller is configured to terminate the repeating of the generation of a virtual route and battery SoC set-points once the vehicle reaches a new segment of the original route such that the remaining portion of the original route has $n_c+1$ segments.

8. The system of claim 1 wherein:
the controller is configured to generate the battery SoC set-points for the segments of the virtual route such that the battery SoC set-point for the first segment of the virtual route is based on at least one of the length of each of the first and last segments of the virtual route, the average vehicle speed along each of the first and last segments of the virtual route, the average road grade of each of the first and last segments of the virtual route, and the battery SoC at the beginning of each of the first and last segments of the virtual route.

9. The system of claim 1 wherein:
the controller is further configured to generate a second virtual route based on the remaining portion of the original route once the vehicle reaches the next segment of the original route, wherein the second virtual route includes a first segment corresponding to the next segment of the original route and a last segment representing at least two other segments of the remaining portion of the original route;
the controller is further configured to generate battery SoC set-points for the segments of the second virtual route; and
the controller is further configured to control the vehicle according to the battery SoC set-point for the first segment of the second virtual route as the vehicle travels along the next segment of the original route.

10. The system of claim 1 wherein:
the characteristic of each segment pertains to vehicle speed such that each segment is associated with a different vehicle speed than neighboring segments.

* * * * *